Figures 1, 2:
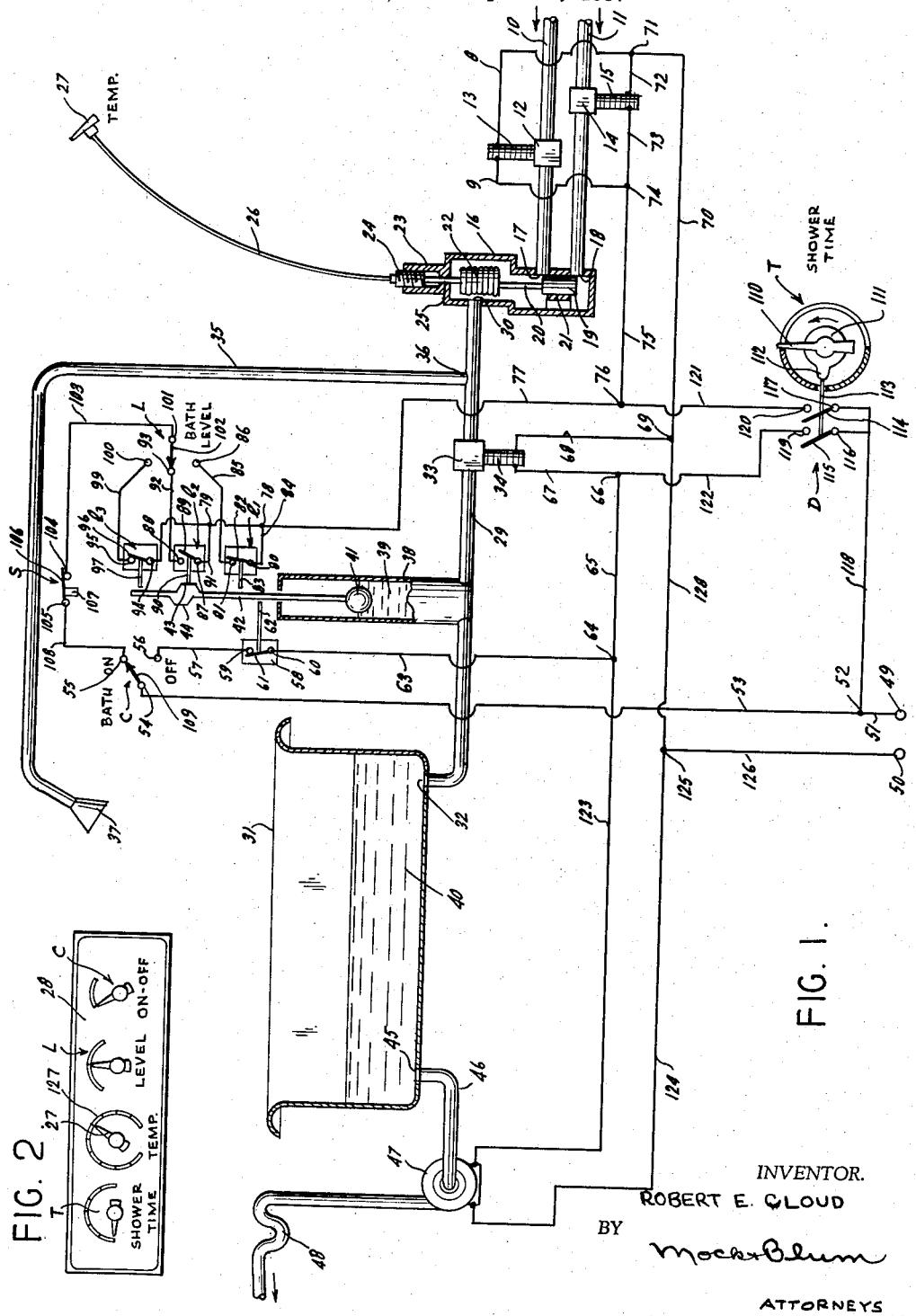

March 17, 1959

R. E. CLOUD 2,877,467

BATHROOM INSTALLATION

Filed Sept. 11, 1957

INVENTOR.
ROBERT E. CLOUD
BY
Mock+Blum
ATTORNEYS

United States Patent Office 2,877,467
Patented Mar. 17, 1959

2,877,467

BATHROOM INSTALLATION

Robert E. Cloud, Longview, Tex.

Application September 11, 1957, Serial No. 683,245

9 Claims. (Cl. 4—148)

The present invention relates to a control for a combination bath and shower and is concerned primarily with such a control that is largely automatic in its operation.

At the present time, it is common practice for bathrooms to include a combination bathtub-and-shower installation. When the bathtub is used, certain factors are of importance. In the first instance, the particular user of the tub is ordinarily desirous of having the water at a level which is most comfortable and convenient for him. Then again, he is desirous of having the water at some predetermined temperature to which he is accustomed. Finally, after the bath is finished, it is desirable that the tub be quickly emptied so as to avoid the collection of sediment at the bottom thereof.

In the taking of a shower, the temperature of the water should be that to which the bather is accustomed. Moreover, most people like to take a shower of some predetermined length of time. Finally, it is desirable that the tub into which the shower water falls be maintained in a drained condition.

With the foregoing considerations in mind, the present invention has in view as an important objective the provision of a control for a combination bath-and-shower installation which is capable of adjustment for each of the features above noted, and, after once having been adjusted, will automatically operate after an initial control switch is once turned on.

More in detail, the invention has as an object the provision of a bath-and-shower control of the type aforesaid that is electrically operated and which is made up of various electric circuits and switches which provide the desired automatic operation.

Every installation of the type with which this invention is concerned will have available a source of supply of hot water and a source of supply of cold water. An important object of this invention is to provide, in a control of the character aforesaid, a mixing chamber that communicates with the hot and cold water supply lines and in which is mounted an adjustable mixing valve that may be adjusted to achieve a desired temperature of water in the mixing chamber, and which valve has operatively connected thereto a thermostat which is effective to automatically maintain the water in the mixing chamber at the desired temperature.

Another object in view is to provide, in an installation and control of the character aforesaid, hot and cold water supply lines each of which includes a normally closed solenoid-operated valve. The solenoid of each valve is connected in with the electric control so that, when the circuit thereto is completed, the valve will open, and will close upon interruption of the circuit to the solenoid.

Another object in view is to provide, in an installation and control of the character indicated, a conduit which extends from the mixing chamber to the bathtub. Included in this conduit is a solenoid-operated valve that is normally open. Between this valve and the mixing chamber a branch conduit extends to the shower head. Thus, with the valve open, water flows from the mixing chamber to the shower head. The solenoid of this last-mentioned valve is connected to the electric system of the control.

Another object is to provide, in an installation and control of the type indicated, a riser tube that communicates with the conduit leading to the tub, and which tube is provided with a float that is mounted on one end of a rod that is provided with cams for operating certain switches of the control system.

Another ozject of the invention is to provide, in an installation and control of the character aforesaid, a drainpipe in which is included an electrically operated pump which drains water from the tub. This pump is connected in with the electric system so that it is continuously operated while the shower is being used and is brought into operation after a bath has been finished, but is automatically stopped when the tub has been drained.

Another object in view is to provide, in a control of the type noted, an adjustable shower-timing switch which may be turned on to start the shower and which will cause the shower to be continued for a predetermined length of time, whereupon the shower is automatically stopped.

Still another object in view is to provide, in a control of the character aforesaid, a main control switch for the bath that may be turned on to automatically fill the tub to the level for which it has been set and which may be turned into an "off" position to drain the tub.

Another object of the invention is to provide a control of the type aforesaid with a safety switch that is properly co-related with respect to the float-actuated rod and which switch is adapted to be opened just before the tub overflows to interrupt the circuit to the control valves in the hot and cold water lines and thus close these valves.

A bathroom installation having a control associated therewith in accordance with the above-noted objectives presents the advantage of enabling the user to take either a bath or shower with a minimum of inconvenience. Assuming that a particular bather likes the water at a certain level and certain temperature and the controls for these factors have been properly adjusted, then, each time this bather wants to take a bath, all he has to do is to turn the main control valve for the bath to the "on" position; whereupon the tub will be filled to the desired level with water of a desired temperature. After the bath has been completed, all the bather has to do is turn the control switch to the "off" position, whereupon the tub will be fully drained.

Assuming that the user of the installation is accustomed to a shower of predetermined duration and temperature, and that the temperature control has been properly adjusted, then all the taker of the shower has to do is simply turn the shower switch to the point indicating the duration thereof. The shower will then automatically operate for this period; and the water coming from the shower head will be of the desired temperature. During this period, the tub will be drained by the pump and maintained in a comfortable condition.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a combination bath-and-shower installation, together with an automatic electric control therefor, which enables a bather to fill the tub to a required level of water at a desired temperature by a simple operation and drain the tub after use by another simple operation. The control also enables a person desirous of taking a shower to have the shower water at a desired temperature and the shower of a predetermined duration, with the tub maintained free of water.

For a full and more complete understanding of the invention, reference may be had to the following description and accompanying drawing, wherein:

Figure 1 is a diagrammatic view depicting certain parts of the installation in elevation and other parts in section, with the electric system represented by a wiring diagram; and Figure 2 is a view in front elevation of a control panel that includes the several switches that are to be operated by the user.

Referring now to the drawing, wherein like reference characters denote corresponding parts, and first more particularly to Figure 1, a cold-water supply line is identified by the reference character 10 and a hot-water supply line by the reference character 11. Included in the cold-water supply 10 is a valve 12 operated by a solenoid 13, and which valve is normally closed. Included in the hot-water line 11 is a valve 14 that is operated by a solenoid 15; and this valve is also normally closed.

A water-mixing chamber is represented at 16. The cold-water supply line 10 communicates with the chamber 16; and the outflow port of the cold-water line 10 is depicted at 17. The hot-water line 11 also communicates with the mixing chamber 16, with the outflow port thereof being indicated at 18. A mixing valve 19 is carried by a rod 20 and assumes a position partially closing the ports 17 and 18. In one extreme position, one of these ports may be substantially closed with the other port substantially open; and in the other extreme position this condition will be reversed. Thus it is evident that the valve member 19 may be shifted by moving it in the guide 21, in which it is mounted to achieve a proper balance in the hot and cold water which is admitted to the mixing chamber 16 from the lines 10 and 11.

Connected to the rod 20 is a temperature-sensitive element, such as a thermostat 22, which is responsive to changes of temperature of the water in the mixing chamber 16 to shift the mixing valve 19.

Upstanding from the mixing chamber 16 is a tubular extension 23 which threadably receives an adjusting plug 24. A rod 25 connects the thermostat 22 to the plug 24. A flexible cable 26 has one end connected to the plug 24 and its other end to an operating member 27 that is mounted on the instrument panel shown at 28 in Figure 2.

It is evident that this operating member 27 is available to rotate the plug 24 and thus shift the thermostat 22 and mixing valve 19 as a unit so as to set the mixing chamber for a desired temperature. After this adjustment has been made, the temperature of the water in the mixing chamber affects the thermostat 22 to automatically maintain the water at the required temperature.

A main conduit 29 has one end in communication with the mixing chamber 16, as indicated at 30; and its other end communicates with a bathtub 31, as indicated at 32. Included in this conduit 29 is a valve 33 that is operated by a solenoid 34; and this valve 33 is normally open; that is, the solenoid 34 must be energized to close the valve.

Between the valve 33 and mixing chamber 16, one end of a branch conduit 35 is connected to the conduit 29 as indicated at 36; and the other end of the conduit 35 is connected to a shower head 37 that is positioned above the tub 31 in a well-known manner.

A riser tube 38 upstands from the conduit 29 between the valve 33 and tub 31; and this riser tube is in communication with the conduit 29 so as to receive water therefrom as indicated at 39. This water 39 in the riser tube will be of the same level as the water 40 in the tub 31. A float 41 is positioned within the tube 38 to be affected by the water 39 therein; and upstanding therefrom is a rod 42 having a cam 43 on one side and a cam 44 on the other side. The purpose of these cams will be later explained.

The tub 31 is provided with an exhaust port or outlet 45 to which is connected an exhaust conduit or drainpipe 46. Included in the latter is an electrically operated drain pump 47. The drainpipe 46 continues out beyond the pump 47 and is formed with a trap at 48. From the trap 48 the drainpipe goes to an appropriate disposal, such as a sewer.

*The electric system*

A source of supply of electric current is represented by the terminals 49 and 50. From the terminal 49 there extends a line 51 to a connecting point 52. From this point 52 the line 51 is continued, as represented at 53, to a terminal 54 of a main control switch that is represented in its entirety by the reference character C. This control switch C also includes terminals 55 and 56. From the terminal 56 a line 57 extends to a drain switch 58 that includes terminals 59 and 60, the line 57 being connected to the terminal 59.

The terminals 59 and 60 are adapted to be bridged by a switchblade 61 which carries an operating member 62 that is adapted to be engaged by the cam 44 on the rod 42. From the terminal 60 a line 63 extends to another connecting point 64. From the point 64 a line 65 extends to a terminal 66; and from the latter a line 67 extends to one side of the solenoid 34. From the other side of the solenoid 34 a line 68 extends to another terminal 69. From the terminal 69 a line 70 extends to a terminal 71. From the terminal 71 a line 72 extends to one side of the solenoid 15; and a line 73 extends from the other side of the solenoid 15 to a terminal 74. From the terminal 74 a line 9 extends to one side of the solenoid 13; and from the other side of the solenoid 13 a line 8 extends to the terminal 71.

From the terminal 74 a line 75 extends to another terminal 76; from this terminal 76 a line 77 extends to terminals 78 and 79 of level switches $1^1$ and $1^2$. A third level switch is shown at $1^3$. Level switch $1^1$ includes terminals 80 and 81 that are adapted to be bridged by a blade 82. This blade 82 carries an operating member 83 adapted to be engaged by the cam 43 on the rod 42. The terminals 78 and 80 are connected by a line 84. From the terminal 81, a line 85 extends to a terminal 86 of a level control L.

The level switch $1^2$ includes terminals 87 and 88 that are bridged by a switchblade 89. This blade 89 carries an operating member 90 that is adapted to be engaged by the cam 43.

The terminals 79 and 87 are connected by a line 91. From the terminal 88, a line 92 extends to another terminal 93 included in the level control L. The level switch $1^3$ includes terminals 94 and 95 that are bridged by a blade 96 which carries an operating member 97. The terminals 79 and 94 are connected by a line 98; while the terminal 95 is connected by a line 99, with another terminal 100 included in the level control L.

At this point it is well to note that all of the level switches $1^1$, $1^2$, and $1^3$ are normally closed; but any of them are adapted to be opened by upward movement of the rod 42 and engagement of the cam 43 with any of the operating members 83, 90, and 97.

The level control L includes a terminal at 101 to which one end of a pivotally mounted switchblade 102 is connected. This switchblade 102 is adapted to connect any of the terminals 86, 93, or 100 with the terminal 101.

From the terminal 101 a line 103 extends to the terminal 104 of a safety switch S. The latter also includes a terminal 105 and a switchblade 106 carrying an operating member 107 that is adapted to be engaged by the upper end of the rod 42. A line 108 connects the terminal 105 with the terminal 55. The control switch C includes a pivotally mounted blade 109 that is adapted to connect either of the terminals 55 or 56 with the terminal 54.

A shower timer is represented at T. It includues an operating member 110 mounted on a hub 111 that is formed with a cam 112. This cam 112 is adapted to operatively engage an operating member 113 carried by blades 114 and 115 of a double-pole, single-throw switch D. The switch D includes terminals 116 and 117 that are connected by a line 118 with the connecting point 52. The double-pole, single-throw switch D also includes terminals 119 and 120. The terminal 120 is connected with the terminal 76 by a line 121. Terminal 119 is connected with the terminal 66 by a line 122.

From the terminal 64 a line 123 extends to one side of the pump 47. From the other side of the pump 47 a line 124 extends to a terminal 125. From the terminal 125 a line 126 extends to the power terminal 50. It will be noted a line 128 connects the terminals 69 and 125.

Operation

The operation of the foregoing installation control will first be described in conjunction with use of the bathtub 31. The user first adjusts the temperature control 27 to the temperature at which he wants the water that is to be delivered to the tub 31. He also adjusts the level control L to the level at which he wants the water. In accordance with the form of the invention illustrated in the drawing, three different levels are provided by the level switches $1^1$, $1^2$, and $1^3$. By adjusting the level control L, the proper one of the terminals 86, 93, or 100 will be engaged by the switchblade 102.

The switchblade 109 is now moved to the "on" position in which it engages the terminal 55. Electric current will now flow from the power terminal 49 through lines 51 and 53, switchblade 109, line 108, switchblade 106, and line 103 to the terminal 101 in the level control L. From the latter it flows through switchblade 102 and through any one of the level switches to which it is connected to the line 77 and from the latter through line 75 to the terminal 74. From the terminal 74 to the terminal 71, the solenoids 13 and 15 are connected in parallel. Thus both of these solenoids will be energized to open the valves 12 and 14 and admit hot and cold water to the mixing chamber. From the terminal 71, the circuit is completed by the lines 70, 128, and 126 back to the power terminal 50.

As water is admitted to the tub 31, it is also admitted to the riser tube 38; and as the water rises in this tube the float 41 will rise. This moves the rod 42 upwardly; and this action is continued until the cam 43 engages the operating member of the level switch $1^1$, $1^2$, or $1^3$ that has been rendered effective by adjustment of the level control L. When this switch is open, the circuit to the solenoids 13 and 15 is interrupted and the valves 12 and 14 closed.

After completion of the bath, the user throws the switchblade 109 to the "off" position in which it engages the terminal 56. Current now flows from power terminal 49 through lines 51 and 53, switchblade 109, line 57, switchblade 61, lines 63 and 123 to the pump 47, and from the latter back through lines 124 and 126 to the power terminal 50. Thus, the pump 47 is brought into operation to drain the tub. As the tub drains, water is also drained from the riser tube 48, causing the float 41 to be lowered; and when the latter reaches the position in which the tub is empty, the cam 44 engages the operating member 62 to open the switch 58 and thus interrupt the circuit to the drain pump 47. Thus the pump 47 is automatically stopped.

It is possible for the user of this control to first set the control for a low level and later adjust level control L for a higher level, in which event substantially the same operation above described would take place. However, in the event the level control was first set for a high level and the user should change his mind and attempt to set it for a lower level, the control might not function to accomplish this result, as the later-closed circuit through either contact 86 or 93 might have been previously passed by the cam 43. To take care of this contingency, the safety switch S is provided directly over the float rod 42. If water should reach a dangerously high level in the tub 31, the water 39 in the riser tube will reach a corresponding level, which will cause the float 41 to move the rod 42 upwardly to the point where its upper end engages the operating member 107 on the switchblade 106 to open the safety switch S and thus interrupt the circuits to the solenoids 13 and 15 and thus close the valves 12 and 14.

When the device is to be used for taking a shower, the temperature control 27 is first set for the desired temperature. The shower timer T is now turned on, with the operating member 110 being moved to the point which will provide for the desired duration of the shower as represented on the dial T. This moves the cam 112 out of engagement with the operating member 113 and thus causes the double-throw switch D to be moved to the closed position. In this closed position, the blade 115 bridges the terminals 116 and 119; while the blade 114 bridges the terminals 117 and 120. Current now flows from power terminal 49 through lines 51, 118, switchblade 115, lines 122 and 67 to one side of the terminal 34, and from the other side of the terminal through lines 68, 128, and 126 back to the power terminal 50. The energization of the solenoid 34 closes the valve 33 and diverts the water coming from the mixing chamber 16 through the branch conduit 35 to the shower head 37.

At the same time, current flows from power source 49 through lines 51 and 118, switchblade 114, lines 121 and 75, to the terminal 74. The solenoids 13 and 15 are connected between the terminals 74 and 71 in parallel; and from the terminal 71 the current is completed back to the power source 50 by lines 70, 128, and 126. Energization of the solenoids 13 and 15 opens the valves 12 and 14, causing the hot and cold water to be delivered to the mixing chamber 16.

When the prescribed duration of time has elapsed, the cam 112 again engages the operating member 113 to open the double-pole, single-throw switch D and thus interrupt the circuit to the solenoids 13 and 15 and cut off the supply of water.

With the double-pole, single-throw switch D closed, which is the condition that takes place when a shower is to be taken, current is also delivered to the drain pump 47 through the following path: from power terminal 49 through lines 51 and 118 across switchblade 115 and through lines 122, 65, and 123 to one side of the pump 47, and from the other side of the pump 47 through lines 124 and 126 back to power terminal 50. Thus, all the time that the shower is in operation, the pump 47 is operated to drain the tub 31 which receives the water from the shower head 37 and maintain the tub in a comfortable condition.

While a preferred specific embodiment of the invention is hereinbefore set forth, it is to be clearly understood that the invention is not to be limited to the exact circuits, constructions, and devices illustrated and described, because various modifications of these details may be provided in putting the invention into practice within the purview of the appended claims.

What is claimed is:

1. In combination, a bathroom installation comprising a bathtub having an inlet and an outlet, a cold-water supply line, a hot-water supply line, a mixing chamber communicating with said supply lines, a main conduit extending between said mixing chamber and said inlet, a valve in said main conduit, a branch conduit connected to said main conduit between said valve and said mixing chamber, a shower head on the free end of said branch conduit and located over said bathtub, and a valve in each of said supply lines; and an electric control including a solenoid for operating each of said valves, a circuit including the solenoids for the valves in said supply lines and a main control switch, and another circuit including all of said solenoids and a normally open shower switch, said shower switch being adapted upon closing to cause closing of said main conduit valve.

2. The combination set forth in claim 1 together with a single mixing-valve member in said mixing chamber and adapted for simultaneous cooperation with said supply lines, a thermostat operatively connected to said mixing valve member, and a temperature-setting member operatively connected to said mixing valve and thermostat as a unit.

3. The combination set forth in claim 1 together with an electrically operated drain pump, the electric mechanism of said pump being included in the second of said circuits, and a drainpipe connecting said pump to said outlet.

4. The combination set forth in claim 1 in which the shower switch is normally open and has a timing mechanism operatively associated therewith and which when initially actuated closes said shower switch and automatically opens the shower switch upon the elapse of a predetermined time interval.

5. The combination set forth in claim 1 together with a level control switch included in the first of said circuits, a riser tube upstanding from said main conduit between the valve therein and said inlet, a float in said riser tube, a rod carried by said float, and a cam on said rod adapted to engage said level control switch.

6. The combination set forth in claim 1 together with a level control including a plurality of level switches and an adustable operating member for including any one of said level switches in the first of said circuits, and float-operated means for automatically opening the level switch which has been included in the circuit when water in said tub has reached a predetermined level.

7. The combination set forth in claim 1 together with an electrically operated pump included in said circuits, a drainpipe connecting said pump with said outlet, a drain switch included in the first of said circuits, and float-operated means for automatically actuating said drain switch after said tub has been emptied to open the circuit to said pump.

8. The combination set forth in claim 1 together with a safety switch included in the first of said circuits, and float-operated means for automatically opening said safety switch when water in said tub has reached a dangerously high level.

9. In combination, a bathroom installation comprising a bathtub having an inlet, a cold-water supply line, a hot-water supply line, a mixing chamber communicating with said supply lines, a main conduit extending between said mixing chamber and said inlet, a valve in said main conduit, a branch conduit connected to said main conduit between said conduit valve and said mixing chamber, a shower head on the free end of said branch conduit and located over said bathtub, a valve in each of said supply lines, first means for opening all of said valves for supply of water to said bathtub, second means for opening said supply line valves and closing said main conduit valve for supply of water to said shower head, and independent control means for each of said first means and said second means.

References Cited in the file of this patent

UNITED STATES PATENTS

| | | |
|---|---|---|
| 2,035,083 | Mattern | Mar. 24, 1936 |
| 2,402,280 | Green | July 18, 1946 |
| 2,492,913 | Bailey | Dec. 27, 1949 |
| 2,611,256 | Candor | Sept. 23, 1952 |
| 2,619,824 | Condon | Dec. 2, 1952 |